(12) United States Patent
Rosenkranz

(10) Patent No.: US 11,383,273 B2
(45) Date of Patent: Jul. 12, 2022

(54) PIEZO MOTOR

(71) Applicant: PHYSIK INSTRUMENTE (PI) GMBH &. CO. KG, Karlsruhe (DE)

(72) Inventor: Mathias Rosenkranz, Gernsbach (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 562 days.

(21) Appl. No.: 16/485,013

(22) PCT Filed: Feb. 6, 2018

(86) PCT No.: PCT/DE2018/100099
§ 371 (c)(1),
(2) Date: Aug. 9, 2019

(87) PCT Pub. No.: WO2018/145697
PCT Pub. Date: Aug. 16, 2018

(65) Prior Publication Data
US 2020/0038913 A1 Feb. 6, 2020

(30) Foreign Application Priority Data

Feb. 10, 2017 (DE) ..................... 10 2017 102 663.0

(51) Int. Cl.
*B06B 1/06* (2006.01)
*H02N 2/00* (2006.01)
*H02N 2/02* (2006.01)

(52) U.S. Cl.
CPC ......... *B06B 1/0648* (2013.01); *H02N 2/0055* (2013.01); *H02N 2/026* (2013.01)

(58) Field of Classification Search
CPC ..... H02N 2/0055; H02N 2/026; B06B 1/0648
See application file for complete search history.

(56) References Cited

U.S. PATENT DOCUMENTS 9,833,813 B2  12/2017  Rosenkranz
10,177,686 B2  1/2019  Koc
(Continued)

FOREIGN PATENT DOCUMENTS

CN  103843242 A  6/2014
CN  106100435 A  11/2016
(Continued)

OTHER PUBLICATIONS

Second Office Action dated Sep. 8, 2021, by the Chinese Patent Office in corresponding Chinese Patent Application No. 201880011140. 5, and an English Translation of the Office Action. (23 pages).

(Continued)

*Primary Examiner* — Bryan P Gordon
(74) *Attorney, Agent, or Firm* — Buchanan Ingersoll & Rooney PC

(57) ABSTRACT

The invention comprises a piezo motor with a U-shaped housing lower part and a mounted cover. The piezo actuator is mounted between two clamping jaws. Planar guide tracks are formed in the housing lower part to both sides of the piezo actuator. Bearing elements of circular cross-section are arranged between the clamping jaws and the guide tracks. Thrust pieces are braced between the housing cover and the bearing elements, which thrust pieces press the bearing elements against the clamping jaws. Here, the thrust pieces together with the guide tracks of the housing lower part form V-shaped guides.

18 Claims, 4 Drawing Sheets

(56) References Cited

U.S. PATENT DOCUMENTS

| | | | |
|---|---|---|---|
| 2013/0140951 A1* | 6/2013 | Kamijo | B25J 15/02 |
| | | | 310/330 |
| 2013/0140954 A1* | 6/2013 | Kamijo | H02N 2/0015 |
| | | | 310/330 |
| 2014/0246955 A1 | 9/2014 | Rosenkranz | |
| 2014/0249472 A1* | 9/2014 | Mulvihill | A61M 1/83 |
| | | | 604/95.01 |
| 2016/0329835 A1 | 11/2016 | Koc | |
| 2019/0296660 A1* | 9/2019 | Wischnewskiy | H02N 2/007 |

FOREIGN PATENT DOCUMENTS

| | | |
|---|---|---|
| EP | 2200101 A1 | 6/2010 |
| WO | 2013034146 A2 | 3/2013 |

OTHER PUBLICATIONS

International Search Report (PCT/ISA/210) dated May 7, 2018, by the European Patent Office as the International Searching Authority for International Application No. PCT/DE2018/100099.

Written Opinion (PCT/ISA/237) dated May 7, 2018, by the European Patent Office as the International Searching Authority for International Application No. PCT/DE2018/100099.

Notification of the First Office Action dated Feb. 2, 2021, by the Chinese Patent Office in corresponding Chinese Patent Application No. 201880011140.5, and an English Translation of the Office Action. (23 pages).

* cited by examiner

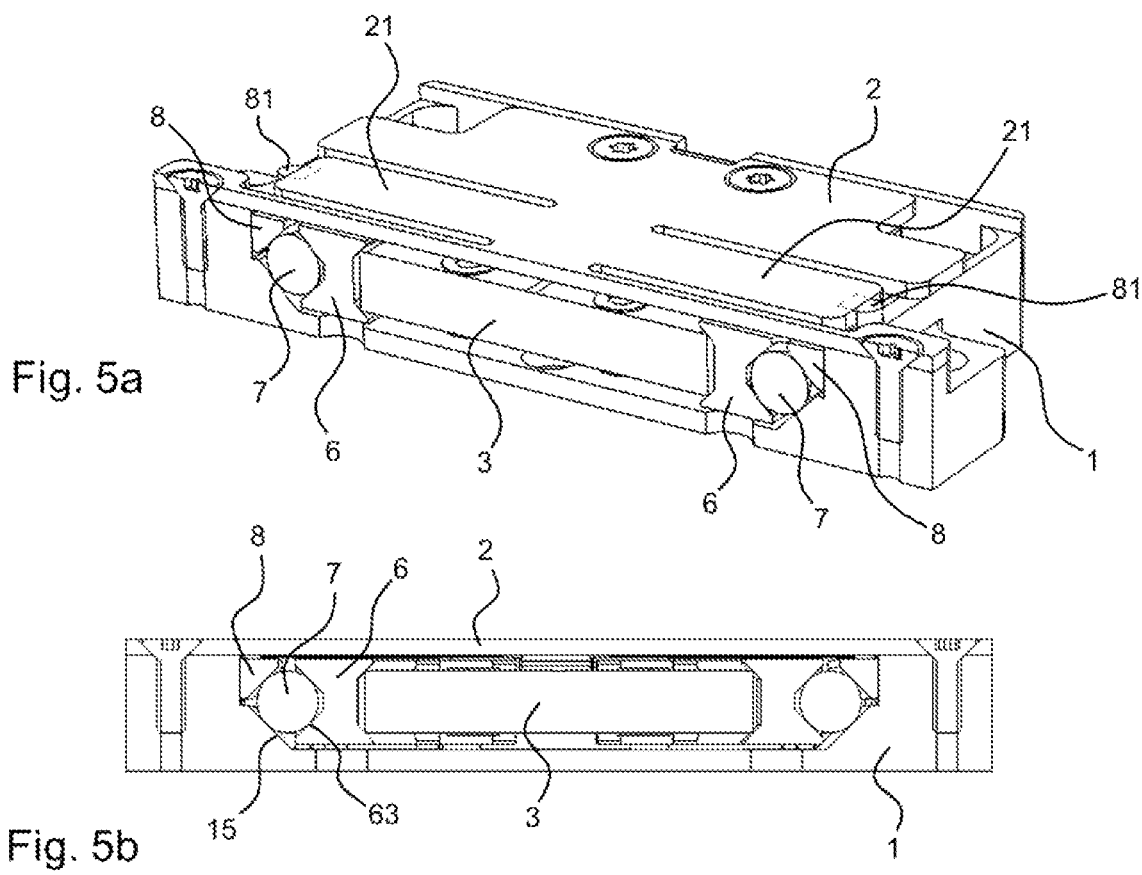
Fig. 5a
Fig. 5b
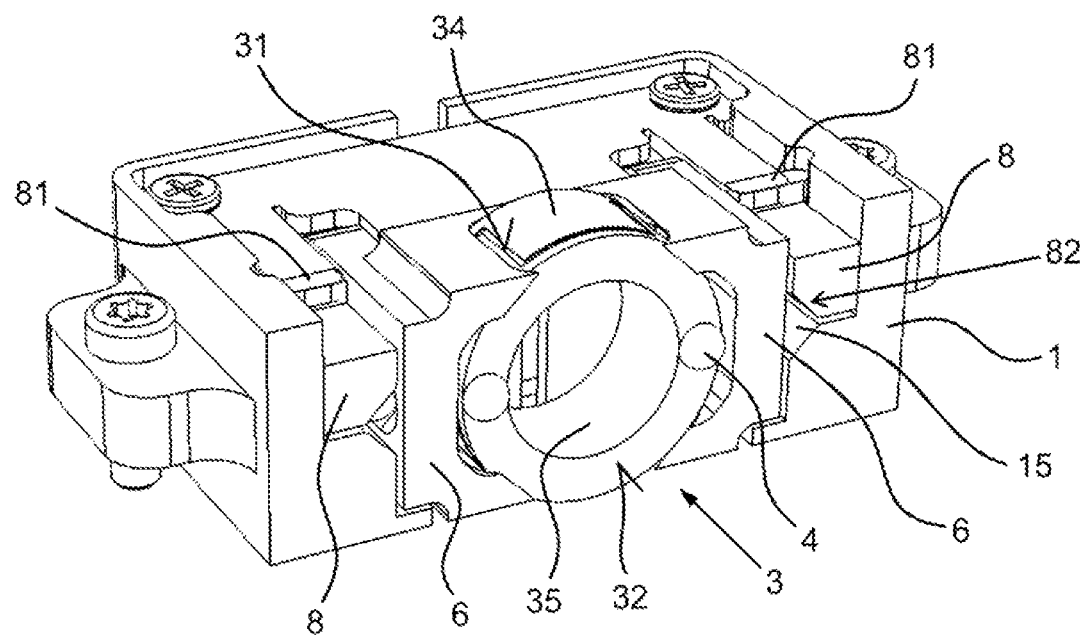
Fig. 6

PIEZO MOTOR

The invention refers to a piezo motor comprising the features specified in the generic term of patent claim 1.

Such a motor with piezoelectric drive is known for example from WO 2013/034146 A2. The core of the motor is an actuator in the form of a flat rectangular cuboid made of piezoelectric ceramic. Electrodes are arranged on the two opposite main surfaces of the piezo actuator. By applying a defined electrical voltage or an excitation voltage to the electrodes, targeted periodic deformations of the piezo actuator occur at a specific frequency. Since the frequency of these periodic deformations is in the ultrasonic range, such piezo motors are also referred to as ultrasonic motors. The periodic deformations of the piezo actuator are transmitted to a friction element arranged on a long side surface of the piezo actuator, so that the front end of the friction element follows a defined path of motion. Said path of motion is such that the friction element pressed against an element to be driven exerts a force on the element in the desired driving direction and thus moves the element along the driving direction. If the excitation voltage is reversed, the piezo actuator drives the element to be driven in the opposite direction.

With the aforementioned piezo motor, the cuboidal piezo actuator is clamped in a rectangular frame, which is composed of two L-shaped frame parts. This frame encloses the piezo actuator almost completely, and only the side surface on which the friction element is arranged is not enclosed by the frame. The two frame parts are held together by a strong spring clamp and pressed against the piezo actuator in such a way that it is held backlash-free in the frame.

The aforementioned piezo motor also has a two-part housing consisting of a U-shaped housing lower part and a flat housing cover with spring sections. The frame is slidably mounted in the housing in such a way that it can move almost unhindered in the direction of the element to be driven (x-direction) together with the piezo actuator arranged in it, while undesired movement in the transverse direction (y-direction) or upwards or downwards (z-direction) is prevented. Guide grooves are provided between the inside of the housing lower part and the lower side of the frame and between the top of the frame and the housing cover. These guide grooves extend parallel to the end faces of the piezo actuator or at right angles to its long side face on which the friction element is seated. The guide grooves each contain bearing elements that are designed as cylindrical sliding pins in the embodiment described in WO 2013/034146 A. Spring-elastic sections of the housing cover exert pressure on the sliding pins so that the frame with the piezo actuator is precisely mounted in the housing. Two helical springs press the frame with the piezo actuator and thus the friction element in the direction of the element to be driven, which has the shape of a straight rod. The displacement of the piezo actuator in the direction of the friction element, i.e. transversely to the element to be driven, which is limited by stop elements, serves to compensate for tolerances which can occur due to production as well as wear of the friction element or the friction surface of the element to be driven.

The precision of the motor and its efficiency depend decisively on the fact that the counterforces introduced into the piezo actuator via the friction element do not lead to an undesired displacement of the piezo actuator. The bearing arrangement must be correspondingly rigid.

In the design according to WO 2013/034146 A2, the piezo actuator rests against the side walls of the rectangular frame and the moments introduced are transmitted via the frame to the bearing elements located between the bottom and the cover into the housing. The frame and the spring clamp holding the frame together must be designed to be correspondingly stable. The V-shaped recesses, which accommodate the bearing elements and guide them in parallel, must also be precise and stable in order to effectively prevent undesirable movements of the piezo actuator, especially in the lateral direction, i.e. parallel to the direction of advance of the element to be driven. A further disadvantage is that the design comprises a large number of individual parts, some of which are complex to manufacture, and assembly is correspondingly complex. Finally, this design leads to an overall height that considerably exceeds the thickness of the piezo actuator.

The invention is thus based on the technical problem of providing a further improved high-precision piezo motor with the best possible efficiency, consisting of few individual parts that are easy to manufacture, easy to assemble and characterized by a low overall height.

The solution to this problem is based on a piezo motor according to the generic term of the first patent claim. The object is solved by the features indicated in the characterizing part of the first patent claim.

The piezo motor according to the invention comprises a holder with two clamping jaws arranged at a distance from each other, which clamp a piezo actuator between them and store it in a housing. Planar guide tracks are arranged in the housing—in the case of cuboidal piezo actuator on both sides of the end faces, and in the case of a hollow-cylindrical piezo actuator on both sides of the radially outwardly pointing circumferential surface, said guide tracks extending in parallel to the direction of the desired movement of the piezo actuator, i.e. substantially perpendicularly to the driving the direction of the element to be driven in the housing. Between the bearing elements and spring-elastic sections of the housing there are special thrust pieces, which together with the planar guide tracks in the housing form guides in the form of V-shaped grooves. Under the pressure of the spring-elastic sections of the housing, the thrust pieces press the bearing elements against the clamping jaws, and at the same time the bearing elements are supported and centered in the V-shaped grooves formed by the thrust pieces and the associated guide tracks.

The term 'essentially', which was used previously and subsequently in other places in connection with geometric shapes, is intended to express consistently that the geometric shape designated by it can be recognized as such without any doubt, but that it does not coincide completely with it, but is for the most part identical with it. If the term 'essentially' is used in connection with numerical values or directions, a maximum deviation of 5% from the corresponding numerical value or direction is described.

In the design in accordance with the invention, the forces acting essentially parallel to the long or planar side surfaces of the piezo actuator are transferred to the clamping jaws arranged laterally to the actuator and transferred from these to the bearing elements and via the thrust pieces into the housing. Since all essential components which have to absorb forces are essentially in the same axis, there is—apart from the housing itself—no intermediate part which is subjected to bending. Tolerances, be they dimensional inaccuracies due to production or dimensional deviations due to ageing or temperature, are automatically compensated due to the spring elastic compression of all parts decisive for the precision of the bearing arrangement.

Another great advantage of the invention is that the whole engine consists of only a few details. The parts that are decisive for the precision and ease of movement of the piezo actuator mounting, i.e. clamping jaws, bearing elements and thrust pieces, are simply inserted into the housing and automatically reach their correct position when the piezo motor is assembled. Fits, clamping or snap-in connections or even additional connecting means, such as brackets, can be dispensed with, as can gluing or other joining techniques. Since the bearing elements are located on the end faces or on the outer circumferential surfaces of the piezo actuator and the piezo actuator is for the most part held in a free-floating manner between the clamping jaws, essentially only the thickness or diameter of the piezo actuator determines the required overall height of the motor.

The bearing elements are designed to reduce friction between the housing and the clamping jaws and can therefore consist of a special plastic with optimized tribological properties. In principle, the bearing elements can have almost any shape, for example as sliding pins with rectangular or prismatic cross-section.

It may be advantageous that at least one of the thrust pieces has a chamfer section. It can also be advantageous that at least one of the thrust pieces has a substantially triangular cross-section. This makes it easy to form guides in the form of a V-shaped groove with the chamfer surface or with the corresponding side surface of the essentially triangular thrust piece and the associated guide track.

In the advantageous and expedient design of the invention, guide grooves are formed on the outside of the clamping jaws. The bearing elements, which are circular in cross-section, are located between the V guides formed jointly by the thrust pieces and the assigned planar guide tracks and the corresponding guide grooves. In this design, the guides or guide grooves define the position of the piezo actuator in the housing, especially the distances to the inside of the housing. The two clamping jaws, which clamp the piezo actuator between them, form a kind of carriage, which is movably mounted on the inside of the side walls of the housing forming the U-legs. The wedge-type thrust pieces support themselves against the housing and push the bearing elements into the guide grooves arranged on the outer sides of the clamping jaws, whereby the bearing elements center themselves in the V-shaped guides or guide grooves due to their circular cross-section.

Two cylindrical bearing elements, one for each clamping jaw, would be sufficient to position the piezo actuator precisely in the middle of the housing and at the same time ensure unhindered movement in the x-direction, i.e. in the direction of the element to be driven towards or substantially perpendicular to the driving direction of the element to be driven. However, spherical bearing elements are preferred, whereby the use of two spherical bearing elements per clamping jaw is advisable.

In a further, advantageous and expedient design of the invention, two short guide grooves are incorporated in each of the outer sides of the clamping jaws, each of which accommodates a spherical bearing element. The length of the guide grooves limits the rolling path of the balls so that they cannot jam each other. The lateral bearing by means of two identically designed bearing elements ensures exact parallel guidance of the clamping jaws in the housing. Compared to cylindrical bearing pins, spherical bearing elements have the advantage that they roll in the guide grooves, i.e. they are rolling bearings that are less sensitive to contamination than plain bearings.

Advantageously, the clamping jaws have centering surfaces on their facing inner sides, on which the piezo actuator is supported in a line contact. This allows the piezo actuator to center itself so that it is optimized and preferably aligned exactly horizontally in the housing. The preferably inclined centering surfaces form supports or abutments and keep the piezo actuator parallel at a defined distance between the base and the cover of the housing. The linear contact between the clamping jaws and the piezo actuator only minimally impairs the vibration capability of the actuator, so that this type of bearing ensures maximum motor efficiency.

In another advantageous design of the piezo motor according to the invention, the clamping jaws have a ground plan that corresponds in principle to a large L. The clamping jaws formed in this way not only grip the narrow end faces or the outer circumferential surface of the piezo actuator, but also extend a little parallel to the planar side surface of the piezo actuator, which is opposite the side surface on which the friction element is arranged. Advantageously the clamping jaws are designed as equal parts, which form the right or left clamping jaw solely due to their mirror-image arrangement.

The at least one spring sits advantageously between the clamping jaws and the rear side wall of the housing. Preferably there is a spring between each clamping jaw and the housing, which is preferably designed as a helical spring. These springs press both clamping jaws and via them the piezo actuator in the direction of the element to be driven, in order to guarantee a constant contact pressure of the friction element to the surface of the element to be driven, irrespective of any manufacturing tolerances and wear caused by ageing.

In a particularly preferred embodiment, the housing is designed in two parts and comprises a housing lower part that is open on two sides and an attachable housing cover. When assembled, the housing cover closes one of the open sides of the housing lower part. The housing cover has spring-elastic sections.

Advantageously the housing lower part has retaining sections which interact with corresponding openings in the clamping jaws. This serves to limit the movement of the piezo actuator along the desired direction of movement essentially perpendicular to the drive direction of the element to be driven.

A piezo motor designed in this way can be assembled very easily and quickly by performing the manufacturing steps listed in patent claim 13.

Embodiments of the invention are described below using the attached drawings.

Figure 1:
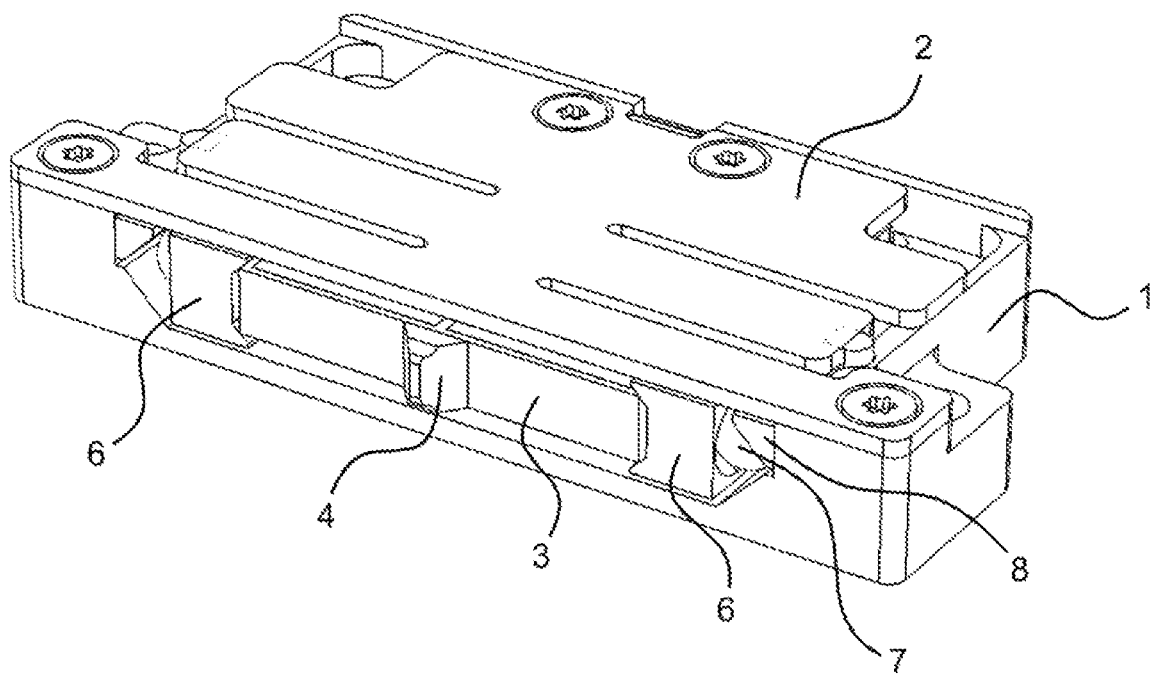
FIG. 1 shows a piezo motor with a rectangular piezo actuator in perspective view from the front.
Figure 4A:
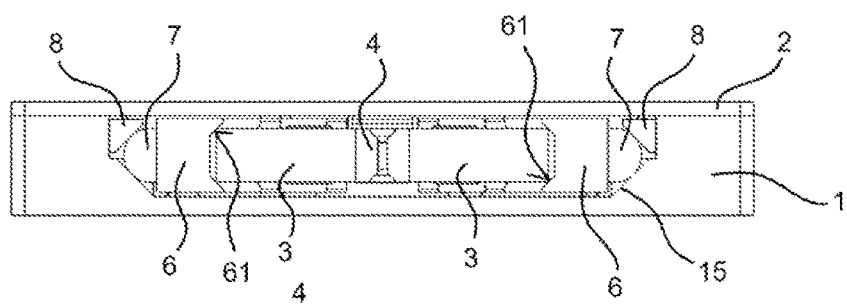
Figure 4B:
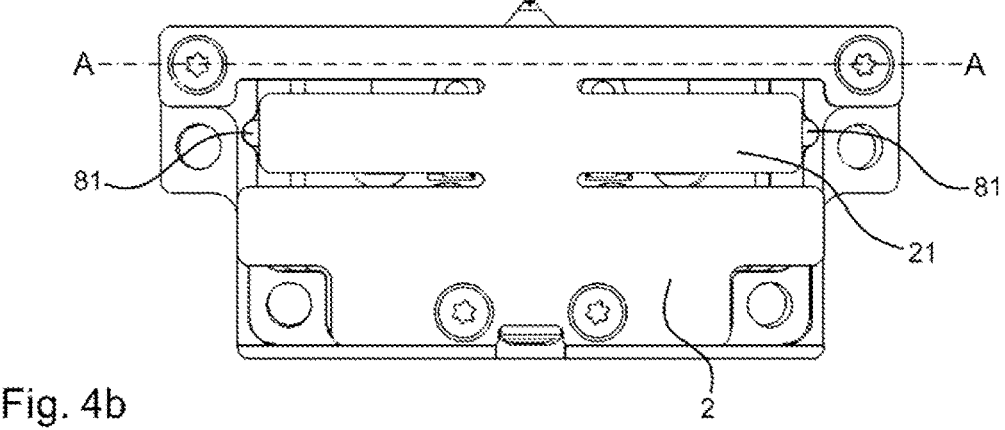

FIG. 4*a* shows the piezo motor of FIG. 1 in a front view;

FIG. 4*b* shows the piezo motor of FIG. 1 in plan view;

FIG. 5*a* shows the piezo motor of FIG. 1, cut along the line A-A in FIG. 4*b*;

FIG. 5*b* shows a horizontal section along line A-A in FIG. 4*b*

Figure 7:
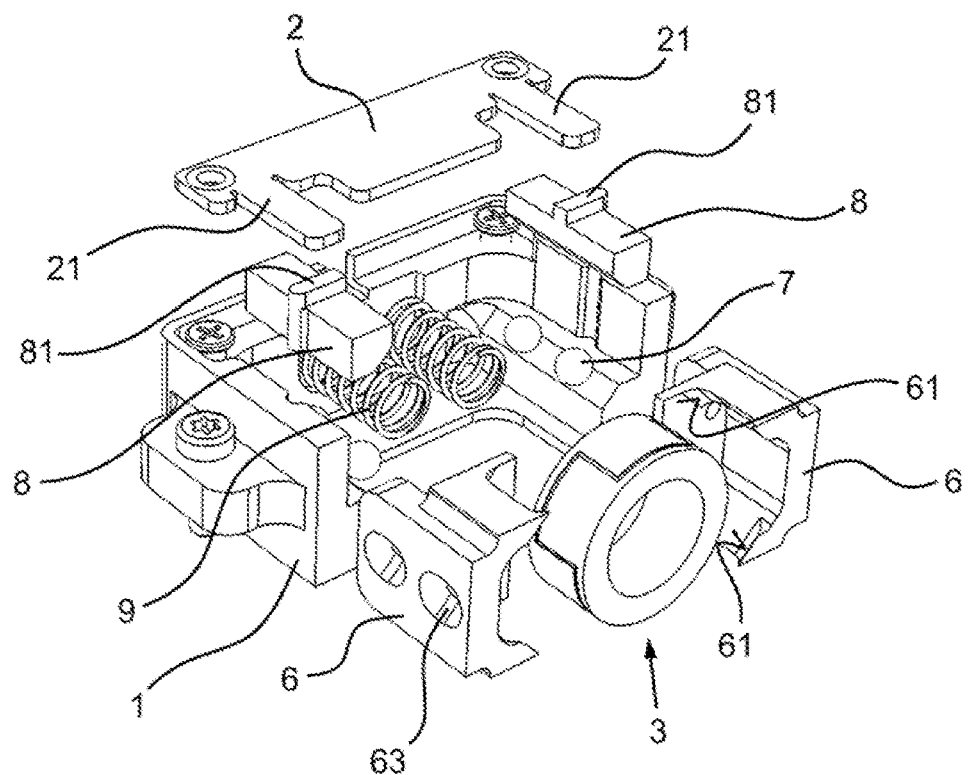

FIG. 6 shows a piezo motor with a hollow cylindrical piezo actuator in perspective view;

FIG. 7 shows the piezo motor of FIG. 6 in a perspective exploded view

Figure 2:
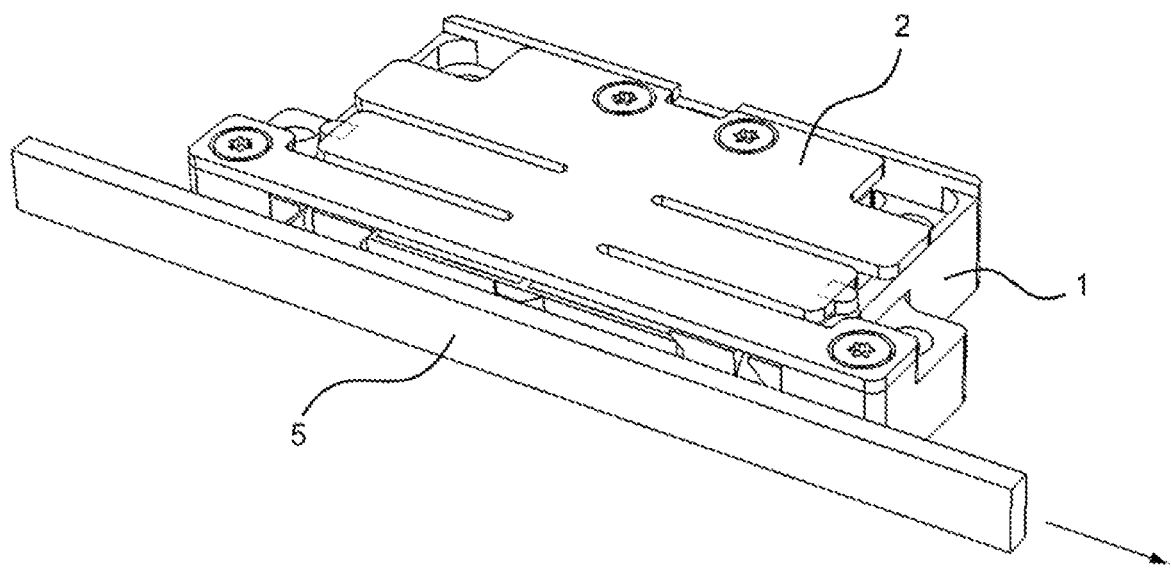
FIG. 2 shows the piezo motor of FIG. 1 with an element to be driven.
Figure 8A:
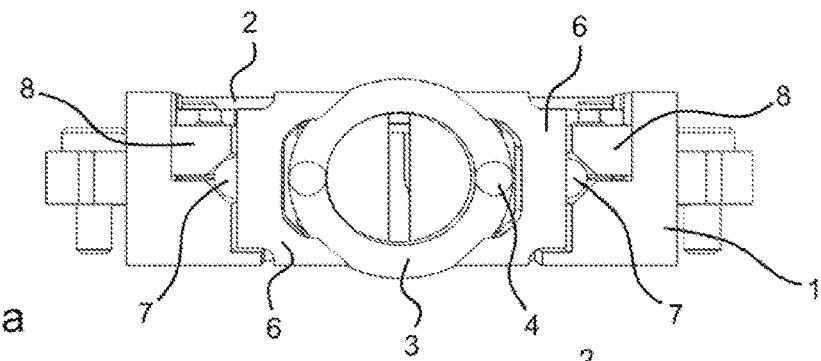
Figure 8B:
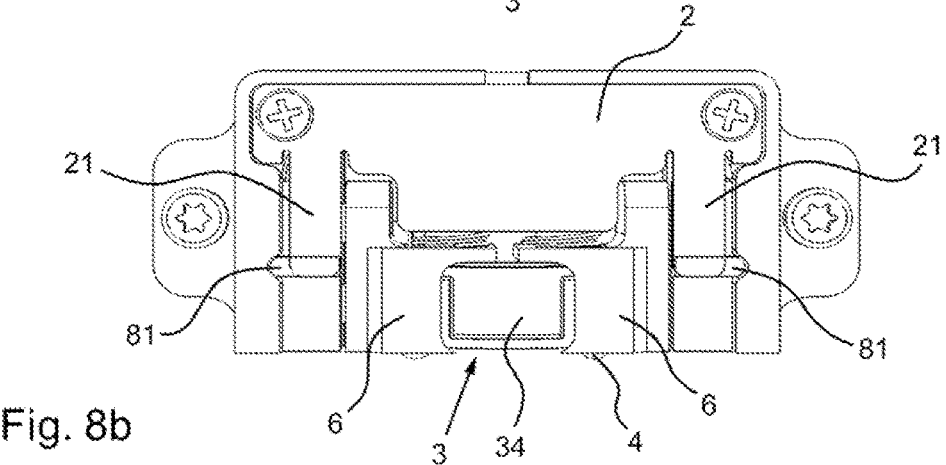

FIG. 8*a* shows the piezo motor of FIG. 6 in a front view;

FIG. 8*b* shows the piezo motor of FIG. 6 in plan view;

The piezo motor shown in FIGS. 1 and 2 has a basically rectangular housing comprising a housing lower part 1, which is tub-like with a basically U-shaped cross-section, and a flat planar housing cover 2. The housing cover 2 is fastened to the housing lower part 1 by means of four countersunk screws.

The front of the housing is largely open, so that in FIG. 1 the piezo actuator 3 inserted in the housing is clearly visible. The piezo actuator 3 has the shape of a flat rectangular cuboid and carries a friction element 4 on its front side facing the observer or on its long side surface.

As can be seen from FIG. 2, the friction element 4 points in the direction of an element 5 to be driven, which here has the shape of a rod with a rectangular cross-section and extends transversely to the friction element 4. The piezo actuator 3 is excited to oscillate with a frequency in the ultrasonic range, whereby the tip of the friction element 4 is set in an oscillating motion, which in the end leads to a lateral motion (in the direction of the arrow shown in FIG. 2) of the element 5 to be driven.

Figure 3:
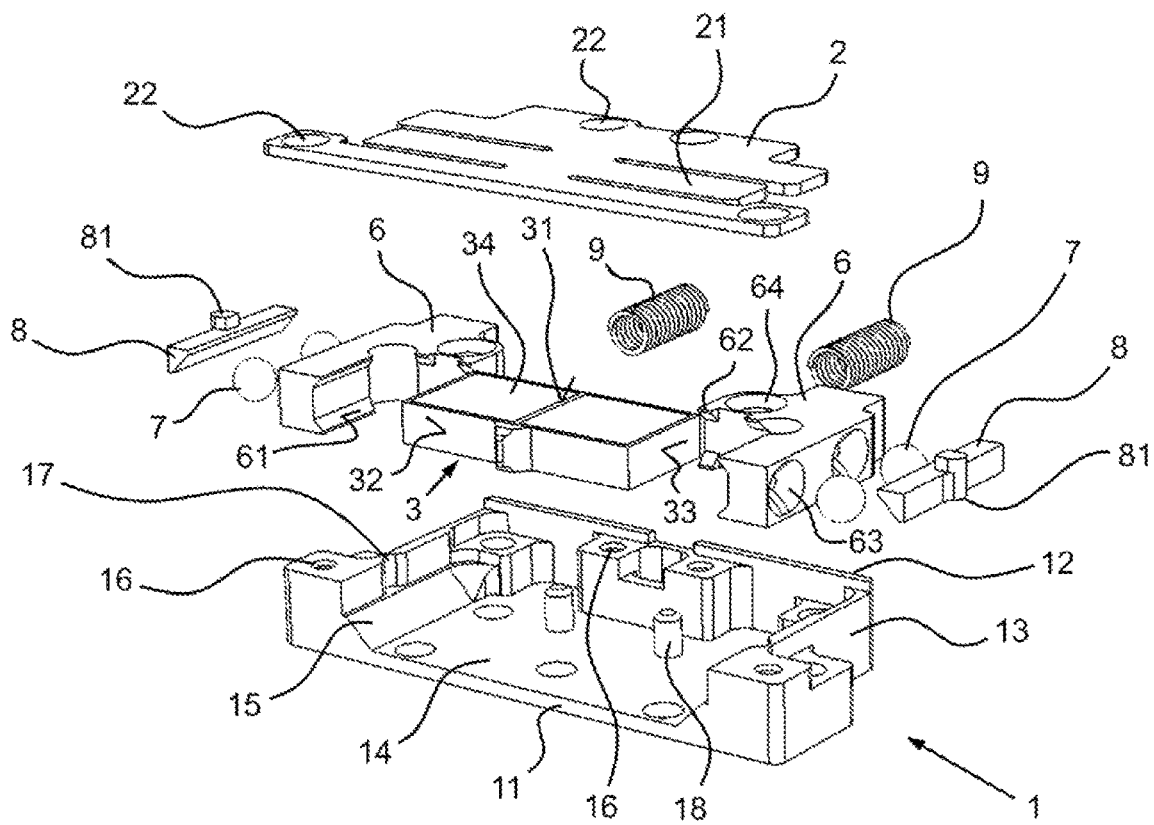
FIG. 3 shows the individual parts of the piezo motor of FIG. 1 in a perspective exploded view.

In the perspective exploded view shown in FIG. 3, the individual parts of which the piezo motor is composed of are clearly visible.

The housing lower part 1 has an essentially rectangular ground plan and is U-shaped in cross-section. It has a flat bottom 11, a closed rear wall 12 and two side walls 13, which form the U-legs. Almost the entire front side is occupied by a wide recess. At the transitions between the bottom 11 and the side walls 13, planar guide tracks 15 are formed, which are at an oblique angle of essentially 45 degrees to the bottom 11. In the area of the front corners and in the area of the rear wall 12 a total of four threaded holes 16 have been made. Approximately in the middle of the housing lower part 1, two pin-like retaining sections 18 extend upwards from the bottom 11 in a vertical direction.

The housing cover 2 is flat and planar. Parallel slots define two narrow spring-elastic sections 21 which extend from the symmetry axis in the middle to the right and left. The housing cover 2 has four mounting holes 22, which are aligned with the threaded holes 16.

The piezo actuator 3 has the shape of a flat rectangular cuboid with two opposing main surfaces 31 and a total of four flat side surfaces. Two of the side faces are long side faces 32, and two of the side faces are short side faces forming end faces 33. The friction element 4 is affixed in the middle of the long side face 32 pointing forwards. Two approximately square excitation electrodes 34 are located on the upward facing main surface 31. The common counter electrode on the opposite main surface is not visible here.

The two clamping jaws 6 have a ground plan that essentially corresponds to the shape of a large L, with the long L-legs extending essentially parallel to the end faces 33 of the piezo actuator 3 and the short L-legs essentially parallel to the rear long side face 32. The clamping jaws 6 each have short centering surfaces 61 on their inner sides pointing towards each other or in the direction of the end faces 33 of the piezo actuator 3, which are arranged on an imaginary V. The inside surfaces of the clamping jaws 6 are planar between the centering surfaces 61.

The clamping jaws 6 are slightly higher than the piezo actuator 3. On the L-legs extending parallel to the rear long side surface 32 of the piezo actuator 3, the clamping jaws 6 carry small diagonal support lugs 62, which form V-shaped holding surfaces.

Two short guide grooves 63 are located on each of the outer sides of the clamping jaws 6. These guide grooves 63 serve to accommodate spherical bearing elements 7, which can roll back and forth a small distance in the guide grooves 63. The guide grooves 63 are shaped like truncated cones at their respective front and rear ends, corresponding to the spherical shape of the bearing elements 7, which (after assembly) are seated in these guide grooves 63.

The clamping jaws 6 each have a through opening 64 in which the retaining sections 18 of the housing lower part 1 engage. This limits the movement of the clamping jaws 6 and thus of the clamped piezo actuator 3 along the direction of movement.

The exploded view of FIG. 3 also shows two mirror-image thrust pieces 8, which are rod-shaped and aligned essentially parallel to the outer sides of the clamping jaws 6 or the end faces 33 of the piezo actuator 3. The thrust pieces 8 essentially have a cross-section in the form of a right-angled triangle, with the corresponding hypotenuses pointing in the direction of the clamping jaws 6. A short projection section 81 is formed approximately in the middle of each thrust piece 8, which has a semicircular cross-section and corresponds in each case with a recess 17, which is also semicircular, on the respective side wall of the lower housing part 1.

The projection sections 81 of the thrust pieces 8 interact with the housing in such a way that the thrust piece 8 is secured against displacement in a direction parallel to the direction of movement of the piezo actuator 3 and the thrust piece 8 is clamped with a defined force between the housing and the bearing elements 7.

Both clamping jaws 6 are identical, but arranged in mirror image. The two thrust pieces 8 are also equal parts. The four balls that form the bearing elements 7 are also identical.

Two identical springs 9, which are designed here as cylindrical coil springs, complete the list of individual parts of the piezo motor. In the assembled state of the piezo motor, the springs 9 are inserted under preload between the rear wall 12 of the housing lower part 1 and the clamping jaws 6 and exert a force on the clamping jaws in a direction towards the opened front side of the housing so that the piezo actuator 3 is also pressed in a direction towards the opened front side of the housing, whereby the friction element 4 is pressed with a defined force against the element 5 to be driven. The movement or displacement of the clamping jaws 6 and thus of the piezo actuator 3 resulting from the compressive force of the springs 9 is strongly limited and defined by the play of the retaining sections 18 in the associated openings 64, whereby the diameter of the retaining sections 18 is correspondingly smaller than the diameter of the openings 64.

When assembling the piezo motor with a flat, rectangular piezo actuator, the two clamping jaws 6 are placed against the end faces 33 of the piezo actuator 3 and then inserted downwards into the housing lower part 1. The four spherical bearing elements 7 are then inserted into the corresponding guide grooves 63 of the clamping jaws 6. The springs 9 are then fitted. Finally, the two thrust pieces 8 are inserted and the housing cover 2 is screwed on.

In particular, the front view of FIG. 4a and the cut in FIG. 5a show how the piezo actuator 3 is clamped between the clamping jaws 6 and how the clamping jaws 6 are themselves mounted in the housing by means of the spherical bearing elements 7 in such a way that the piezo actuator can move exclusively in the direction of the element to be driven (x-direction), but not at right angles thereto, i.e. in the y-direction or in the z-direction.

As can be seen in particular from FIG. 5a, the thrust pieces 8, which are essentially triangular in cross-section, together with the obliquely arranged guide tracks 15 of the lower housing part 1 form two parallel guides in the form of V-shaped guide grooves which receive approximately the half of the spherical bearing elements 7. The other half of the sphere is accommodated the corresponding guide grooves 63 on the clamping jaws 6. The thrust pieces 8, which are only loosely inserted during mounting, are pressed against the spherical bearing elements 7 by the spring-loaded sections 21 of the housing cover 2 after mounting or fastening the housing cover 2 to the housing lower part 1. The bearing elements 7 transmit this pressure to the clamping jaws 6. Due to their circular cross-section in the drawing plane (see FIG. 5b), the bearing elements 7 center themselves in the guide grooves 69 and the opposite guides, formed by thrust piece 8 and guide track 15.

The edges between the end faces 33 and the main faces 31 of the piezo actuator 3 have only line contact with the V-shaped centering faces 61 of the clamping jaws 6. This also causes the piezo actuator 3 to center itself so that it is essentially located parallel and at a defined height between the bottom of the housing lower part 1 and the housing cover 2. The piezo actuator 3 has only linear contact with the clamping jaws 6. Thus, the piezo actuator 3 can oscillate largely unhindered.

FIGS. 6 to 8b show another design of a piezo motor according to the invention which, in contrast to the piezo motor shown in FIGS. 1 to 5b, has a piezo actuator with a hollow cylindrical shape, but is otherwise largely identical to the piezo motor shown in FIGS. 1 to 5b, which is why the following only deals with the existing differences.

The hollow cylindrical piezo actuator 3 has on its radially outwardly pointing circumferential surface, which is a main surface 31 of the piezo actuator 3 a plurality of excitation electrodes 34, which are spaced apart from each other and essentially rectangular. A common counter electrode 35 substantially completely covering the main surface 31 is arranged on the radially inwardly pointing circumferential surface, which also represents a main surface 31 of the piezo actuator 3.

Two diametrically opposed friction elements 4 in the form of spherical sections or hemispheres are arranged on the planar side surface 32 facing the observer of FIG. 6.

The clamping jaws 6 are shaped in such a way that only the outer edges of the hollow cylindrical piezo actuator 3 extending along the circumference come into contact with them. The clamping jaws 6 have centering surfaces 61, which are provided both at the ends of the clamping jaws 6 facing the observer and at the ends of the clamping jaws 6 facing away from the observer.

Each of the thrust pieces 8 has a substantially square cross section, one edge being provided with a chamfer, the thrust piece thus having a chamfer portion 82 which, together with the inclined surface of the guide track 15, forms a substantially V-shaped guide groove.

When assembling the piezo motor with a hollow cylindrical piezo actuator, the two clamping jaws 6 are applied to diametrically opposite sections of the radially outwardly pointing outer circumferential surface of the piezo actuator 3 and then inserted downwards into the housing lower part 1. The four spherical bearing elements 7 are then inserted into the corresponding guide grooves 63 of the clamping jaws 6. Finally the two thrust pieces 8 are inserted and the housing cover 2 is screwed on.

REFERENCE NUMERALS 1 housing lower part
2 housing cover
3 piezo actuator
4 friction element
5 driving element
6 clamping jaw
7 bearing element
8 thrust piece
9 spring
11 bottom (from 1)
12 rear wall
13 side wall
14 recess
15 guide track
16 threaded hole
17 recess
18 retaining section
21 spring elastic section (of 2)
22 mounting holes
31 main surface (of 3)
32 side face
33 end surface
34 excitation electrode
35 common counter electrode
61 centering surface (from 6)
62 support lug
63 guide groove
64 opening
81 projection section (of 8)
82 chamfer section (of 8)

The invention claimed is:

1. Piezo motor, comprising:
  a housing having at least one opening, which includes spring-elastic sections;
  an element to be driven in a driving direction;
  a piezo actuator inserted in the housing and having a friction element arranged on one of its planar side faces, at least the friction element projecting out of the opening of the housing and being provided for contact with the element to be driven;
  a holder comprising two spaced-apart clamping jaws which clamp the piezo actuator between them and support it in the housing in such a way that the piezo actuator can move exclusively in a direction towards the element to be driven which is oriented substantially perpendicular to the driving direction and defines a direction of movement of the piezo actuator;
  at least one spring which presses the piezo actuator against the element to be driven;
  planar guide tracks which are arranged at least in sections in the housing and extend parallel to the direction of movement of the piezo actuator;
  bearing elements arranged between the clamping jaws and the guide tracks and having a circular cross-section; and
  wherein thrust pieces clamped between the spring-elastic sections of the housing and the bearing elements, which together with the guide tracks of the housing form guides in the manner of a V-groove, and the bearing elements are pressed against the clamping jaws by the thrust pieces.

2. Piezo motor according to claim 1, wherein at least one of the thrust pieces has a chamfer section.

3. Piezo motor according to claim 1, wherein at least one of the thrust pieces comprises a substantially triangular cross-section.

4. Piezo motor according to claim 1, wherein each of the thrust pieces comprises:
  a projection section which cooperates with the housing in such a way that the thrust piece is secured against displacement in a direction parallel to the direction of movement of the piezo actuator, and each of the thrust pieces is clamped with a defined force between the housing and the bearing elements.

5. Piezo motor according to claim 1, that comprising:
at least one guide groove for the bearing elements is provided in each of the clamping jaws.

6. Piezo motor according to claim 5, comprising:
between each of the two clamping jaws and the housing, two spherical bearing elements, wherein for each spherical bearing element a guide groove of its own is provided in the clamping jaws.

7. Piezo motor according to claim 1, wherein the clamping jaws comprises:
centering surfaces on their mutually facing inner sides, on which the piezo actuator is supported in a line contact.

8. Piezo motor according to claim 1, where in each of the clamping jaws is substantially L-shaped and each grips around a corner of the piezo actuator.

9. Piezo motor according to claim 1, wherein the clamping jaws are of identical design.

10. Piezo motor according to claim 1, wherein the at least one spring is arranged between the clamping jaws and a side wall of the housing.

11. Piezo motor according to claim 1, wherein the housing consists of two parts, having a lower housing part which is open on two sides and a housing cover which has the spring-elastic sections, the housing cover closing one of the open sides of the lower housing part in the assembled state.

12. Piezo motor according to claim 11, wherein the housing lower part retaining sections for limiting the movement of the piezo actuator along the direction of movement, which cooperate with corresponding openings in the clamping jaws.

13. Method of manufacturing a piezo motor having an element to be driven in a driving direction;
a piezo actuator inserted in the housing and having a friction element arranged on one of its planar side faces, at least the friction element projecting out of the opening of the housing and being provided for contact with the element to be driven;
a holder comprising two spaced-apart clamping jaws which clamp the piezo actuator between them and support it in the housing in such a way that the piezo actuator can move exclusively in a direction towards the element to be driven which is oriented substantially perpendicular to the driving direction and defines a direction of movement of the piezo actuator;
at least one spring which presses the piezo actuator against the element to be driven:
planar guide tracks which are arranged at least in sections in the housing and extend parallel to the direction of movement of the piezo actuator;
bearing elements arranged between the clamping jaws and the guide tracks and having a circular cross-section; and
wherein thrust pieces clamped between the spring-elastic sections of the housing and the bearing elements, which together with the guide tracks of the housing form guides in the manner of a V-groove, and the bearing elements are pressed against the clamping jaws by the thrust pieces; the method, comprising
inserting the piezo actuator between the clamping jaws of the holder;
arranging the spring in the housing;
inserting the holder with the piezo actuator held therein into the housing in such a way that the retaining sections engage in the openings of the holder while simultaneously tensioning the spring arranged between the housing and the holder, a movement of the piezo actuator along the direction of movement being limited due to the engagement of the retaining sections in the openings of the holder;
inserting the bearing elements between the clamping jaws and the housing;
inserting the thrust pieces between the housing lower part and the respectively associated clamping jaw at a position opposite the associated guide track, so that the respective projection section comes into engagement with a corresponding recess of the housing; and
placing and fixing the housing cover on the housing lower part in such a way that the projection sections press against the associated spring elastic sections of the housing cover and elastically bend them, thereby exerting a corresponding compressive force on the thrust pieces in the direction of the respective associated guide track, so that, apart from the element to be driven and the spring, all the individual parts of the piezo motor are tensioned against one another.

14. Piezo motor according to claim 3, wherein each of the thrust pieces comprises:
a projection section which cooperates with the housing in such a way that the thrust piece is secured against displacement in a direction parallel to the direction of movement of the piezo actuator, and each of the thrust pieces is clamped with a defined force between the housing and the bearing elements.

15. Piezo motor according to claim 14, comprising:
at least one guide groove for the bearing elements provided in each of the clamping jaws.

16. Piezo motor according to claim 15, wherein the clamping jaws comprises:
centering surfaces on their mutually facing inner sides, on which the piezo actuator is supported in a line contact.

17. Piezo motor according to claim 16, wherein each of the clamping jaws is substantially L-shaped and each grips around a corner of the piezo actuator.

18. Piezo motor according to claim 17, wherein the at least one spring is arranged between the clamping jaws and a side wall of the housing.

* * * * *